Jan. 5, 1943.   A. H. RZEPPA   2,307,640
CAGE SLOT GRINDER
Filed April 21, 1941   6 Sheets-Sheet 1
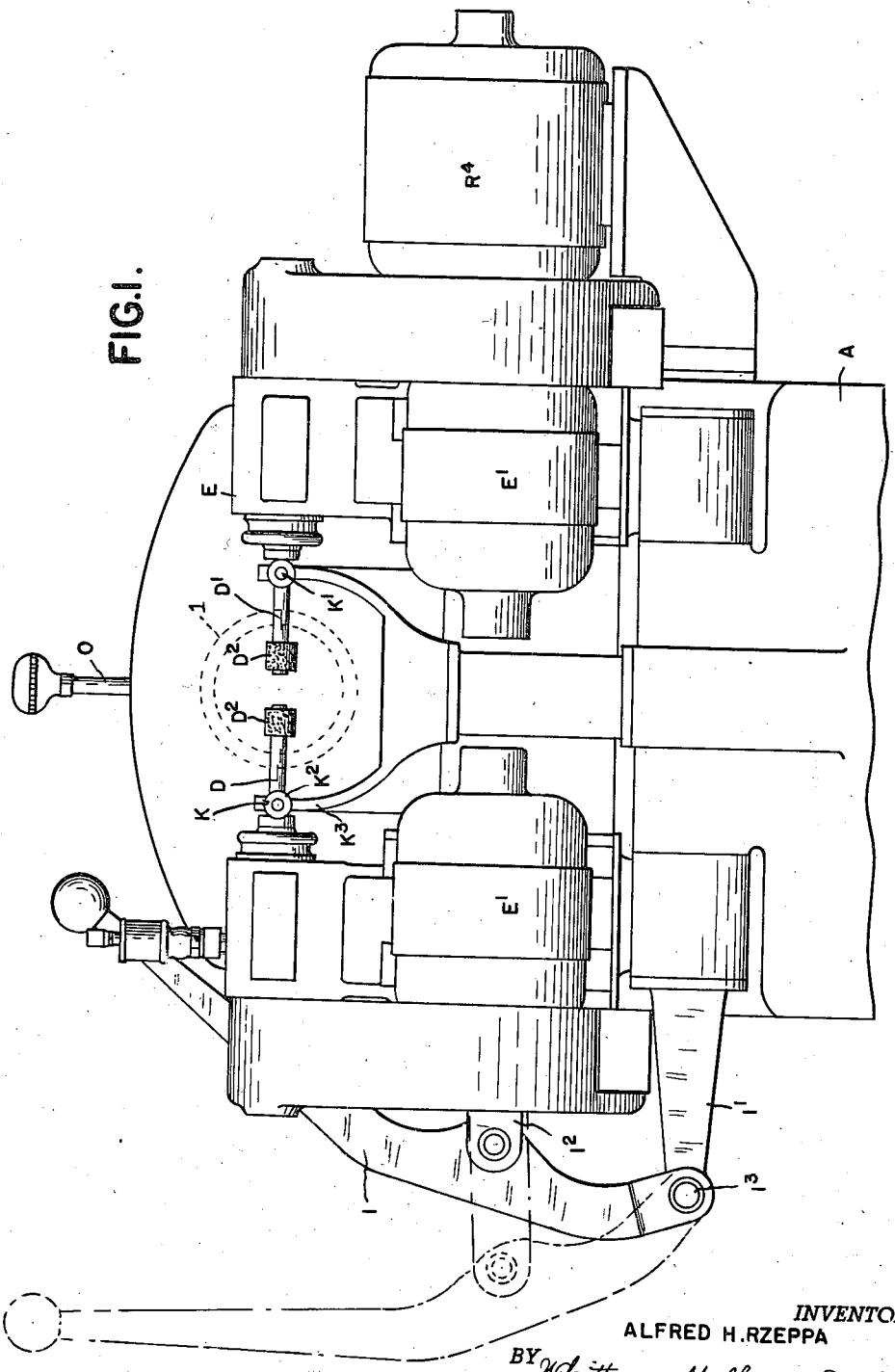
INVENTOR
ALFRED H. RZEPPA
BY *Whittemore Hulbert & Belknap*
ATTORNEYS

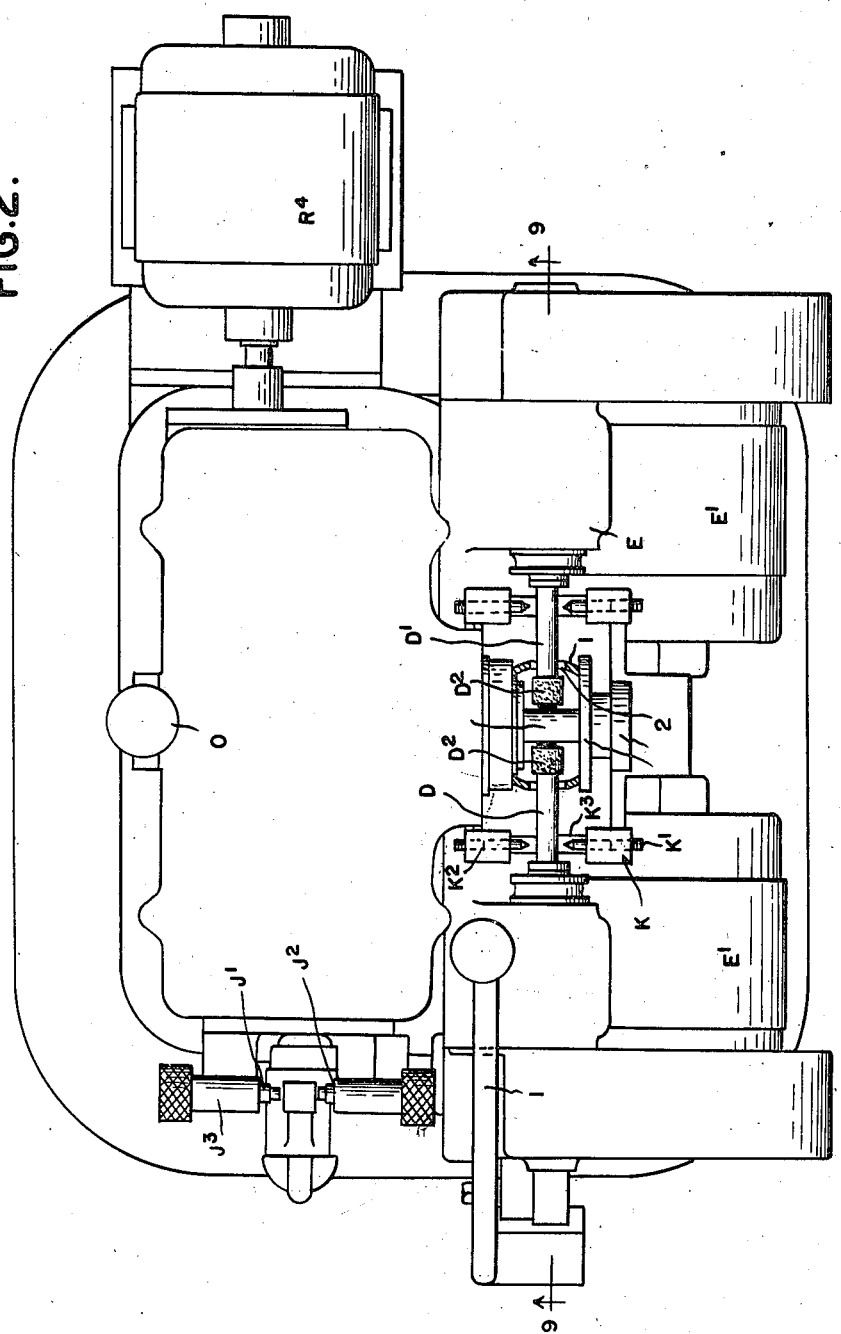

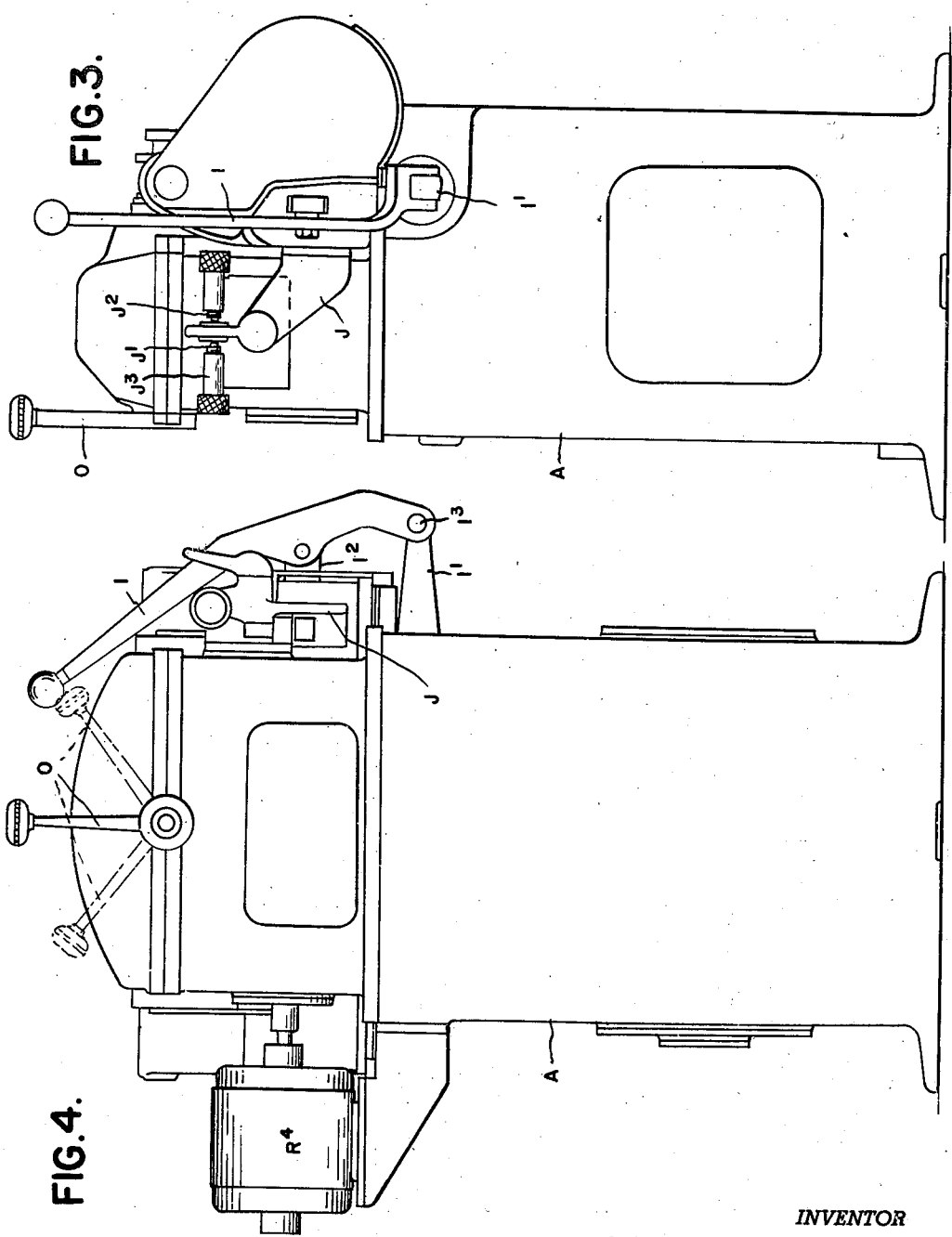

Jan. 5, 1943.     A. H. RZEPPA     2,307,640
CAGE SLOT GRINDER
Filed April 21, 1941     6 Sheets-Sheet 5

INVENTOR
ALFRED H. RZEPPA
BY Whittemore Hulbert + Belknap
ATTORNEYS

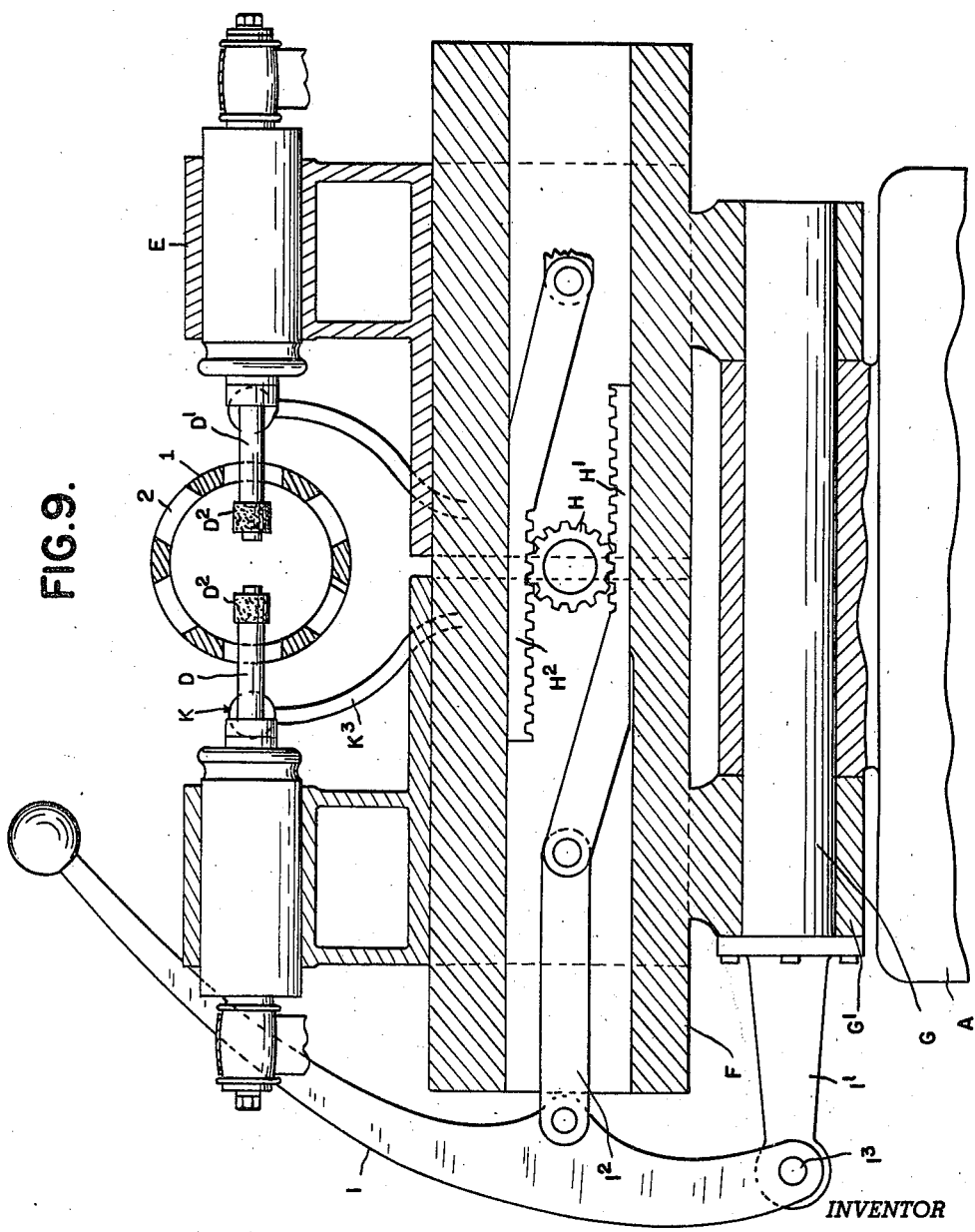

Patented Jan. 5, 1943

2,307,640

UNITED STATES PATENT OFFICE 2,307,640

CAGE SLOT GRINDER

Alfred H. Rzeppa, Grosse Pointe, Mich., assignor to The Gear Grinding Machine Company, Hamtramck, Mich., a corporation of Michigan Application April 21, 1941, Serial No. 389,663

7 Claims. (Cl. 51—46)

The invention relates to machines for grinding slots in annular members and has more particular reference to the grinding of slotted ball cage members such as used in torque transmitting universal joints. The type of universal joint referred to is illustrated in the patents to Rzeppa: No. 1,665,280, April 10, 1928; No. 1,916,442, July 4, 1933; and No. 2,010,899, August 13, 1935.

Such universal joint comprises, essentially, spherically engaged male and female main members having registering spaced meridian ball race grooves therein and torque transmitting balls in said grooves. It is essential that the balls should be maintained in a plane which exactly bisects the angle between the axes of the main members in all positions of adjustment thereof, and to this end the balls are engaged with slots in a concavo-convex spherical cage member arranged between the adjacent spherical surfaces of the main members. Inasmuch as the grooves are spaced farthest apart in the equatorial plane and approach each other in the direction of the poles, the cage member must provide for a limited circumferential movement of each ball. This is accomplished by elongated segmental slots in the cage member, the opposite sides of which are spaced from each other by approximately the diameter of the balls. Thus, in the angular movement of the joint, the balls will travel back and forth along these slots, but are held in a common plane.

It is the object of the invention to obtain a machine which will expeditiously grind the side walls of such slotted cage members with a high degree of accuracy and with a minimum of effort and skill on the part of the workman. To this end, the invention consists in the construction as set forth.

In the drawings:

Fig. 1 is a front elevation of the machine;

Fig. 2 is a plan view thereof;

Fig. 3 is a side elevation;

Fig. 4 is a rear elevation;

Fig. 9 is a vertical cross section substantially on line 9—9 of Fig. 2.

Figure 5:
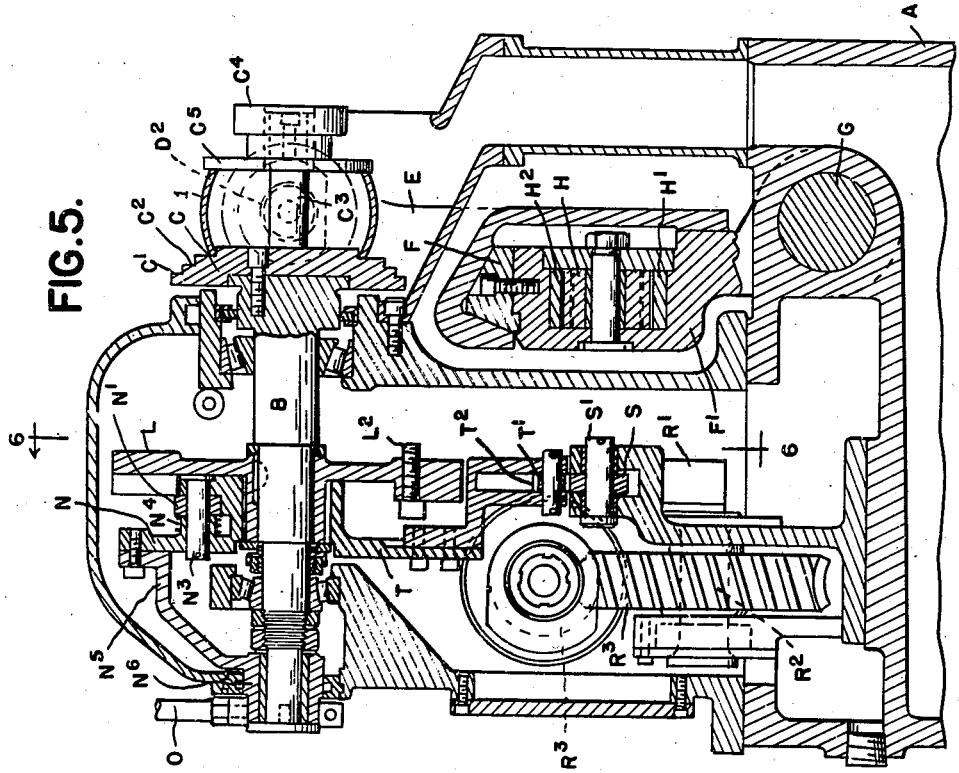
Fig. 5 is a vertical section substantially on line 5—5 of Fig. 6.
Figure 8:
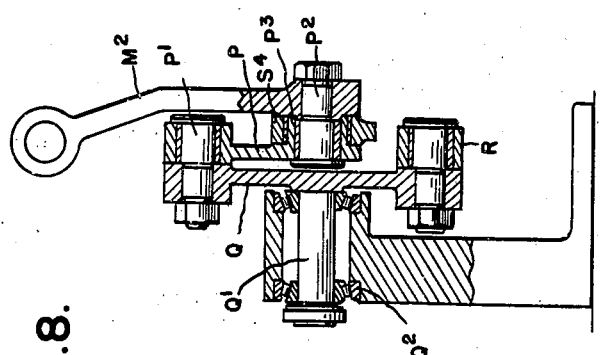
Fig. 8 is a section substantially on line 8—8 of Fig. 6.

Generally described, my improved grinding machine comprises a rotatable holder for the annular member, an indexing mechanism therefor, a grinder wheel of a diameter less than the width of the slot to be ground, means for moving said grinder wheel radially into and out of said slot, and means for oscillating the work holder with an amplitude of movement substantially equal to the length of the slot while said grinder wheel is engaged therewith. The machine is also preferably provided with a second grinder wheel on a diametrically opposite side of the work holder from said first mentioned grinder wheel, together with means for simultaneously moving both of said grinder wheels radially into and out of diametrically opposite slots in the work.

Work holder

More in detail, my improved machine comprises a standard A on which is mounted in suitable bearings a work holder arbor B. At one end of this arbor is a work holder C having a series of annular steps $C'$, $C^2$, etc., for engaging annular work members of different diameters and centering the same. A pin $C^3$ projects axially from the member C, being threaded at its outer end to engage a nut $C^4$, and a disc member $C^5$ sleeved on the pin $C^3$ is clamped against the outer face of the annular work member by the tightening of the nut $C^4$.

Grinders

Mounted on the same standard A and extending transversely to the axis of the work holding arbor are one or a pair of grinder arbors D and D'. These grinder arbors are arranged in alignment with each other on opposite sides of and with their common axis intersecting the axis of the work holder C. Each arbor is journaled on a carriage E which is slidably supported by a guideway F on a rockable frame F'. The latter is pivotally supported on a shaft or pin G extending parallel to the grinder arbors and mounted in bearings G' on the standard A. Each of the carriages E has also mounted thereon a motor E', with a pulley and belt step-up drive connection between the same and the grinder arbor. Thus, each grinding arbor and its driving mechanism are movable upon the guideway F toward or from the axis of the work holder so as to introduce and withdraw the grinder wheels from the slots in the work.

To move the carriages E simultaneously and oppositely on the guideway F, there is mounted on the rockable frame F' centrally thereof a pinion H engaging a pair of rack bars H' and $H^2$, respectively, below and above said pinion. These rack bars are connected to the carriages E, and as they engage the pinion H on diametrically opposite sides thereof, a movement of one of the carriages in one direction will simultaneously impart an equal movement to the other carriage in the opposite direction. This movement of the carriages, as well as the rocking of the frame F', is manually effected through the medium of a lever I which, at its lower end, is fulcrumed on a bracket member I', in axial alignment with the pin G, and intermediate its ends is connected by a link $I^2$ with one of the carriages E. A fulcrum bearing $I^3$ permits rocking of the lever in transverse directions, so that the one lever controls not only the movement of the carriages on the guideway F, but also the rocking movement of the frame F' on the pin G. The latter movement is limited through the medium of a bracket arm J on the frame F', the free end of which extends between a pair of stops J' and $J^2$ adjustably mounted in stationary bearings $J^3$ preferably by having a threaded engagement therewith. The arrangement is such that by setting these stops J' and $J^2$, the opposite sides of the grinder wheels $D^2$ on the arbors D and D' may be positioned in relation to the sides of the slot to be ground in the work.

Trimmers for grinders

The grinders $D^2$ are trued as well as accurately positioned in relation to the work, by trimmers K. These are arranged in pairs and on diametrically opposite sides of the axis of the grinder arbors so that during the movement of the carriages E the grinders $D^2$ will pass the diamond trimming points. As shown, the trimmers K are adjusted by screws K' engaging threaded bearings $K^2$ on brackets $K^3$ arranged on opposite sides of the work holder. This permits adjusting the trimmers so that the trimming points thereof will be accurately aligned with the finished edges of the slots to be ground in the work, so that when the grinder wheel passes the trimming point, its grinding surface will be properly positioned.

Indexing mechanism

The work supported in the holder C must be rotatably adjusted to bring different pairs of diametrically opposite slots therein into operative relation to the grinders $D^2$. As shown, the work to be ground is a ball cage member 1 which has six ball slots 2 therein, arranged in three pairs of diametrically opposite slots. The indexing mechanism includes an index plate or disc L mounted on the arbor B and having six peripheral notches L' therein, distributed at equal angles around the axis thereof. These notches are adapted for engagement with a pin M carried by a lever M' which under certain conditions will hold the disc against rotation. A second lever or rock arm N, fulcrumed on the arbor B, carries a pawl N' which, upon the rocking of said rock arm N, will engage a pin or lug $L^2$ on the disc L to impart rotary motion to said disc. However, before the disc can be revolved, the pin M must be disengaged from the notch L', which is effected by a cam $N^2$ at the end of the pawl N'. This cam engages the pin M prior to the engagement of the pawl with the lug $L^2$, so that said pin is sufficiently disengaged from the notch L' to permit movement of the disc prior to contacting the pawl with the lug. Further movement will then carry the disc around until the pin M registers with another notch L', whereupon a spring $M^2$ will move the lever M' and force the pin into engagement with said notch. During the reverse movement of the rock arm N, the pawl N' will latch past the lug $L^2$ and pin M, this being permitted by its pivotal connection $N^3$ with said rock arm. A torsional spring $N^4$ will then return the pawl to its normal position. The rock arm N is preferably carried by an arm $N^5$ which has a hub $N^6$ surrounding the arbor B and having connected thereto a manually actuated lever O.

Oscillating mechanism for the work holding arbor

As thus far described, the index disc L is normally connected by the pin M to the lever N' and as has been stated, this lever will, under certain conditions, hold the pin M stationary. However, it is necessary, during the grinding of the slots by the grinders $D^2$, that the arbor should oscillate sufficiently to relatively move the grinder the full length of the slot. This in turn necessitates a corresponding oscillatory movement of the pin M and the lever M' carrying the same. To permit both of these functions, the lever M', instead of being fulcrumed upon a stationary support, is carried by a link P which in turn is connected by a pivot P' with the end of a lever Q. This lever is centrally fulcrumed by attachment to a shaft Q' which is mounted in antifriction bearings $Q^2$ in a stationary frame. The opposite end of the lever Q is pivotally connected on a rod R which at its opposite end engages a crank R' on a crank shaft $R^2$. The crank shaft is revolved through the medium of a step-down worm gear transmission $R^3$ from a motor $R^4$.

It will therefore be apparent that the oscillation of the rod R by the rotation of the crank R' will impart a similar oscillatory movement to the lever Q, which in turn through the connecting link P may impart an oscillation to the lever M' and to the disc L. However, the link P being pivotally connected to both the levers Q and M' will permit independent swinging of this link, and if it were to be moved so that the fulcrum axis of the lever M' should coincide with the fulcrum axis of the lever Q, then no movement would be communicated from the lever Q to the lever M'. Such movement of the link P is automatically effected by a portion of the movement of the manually operated lever O through the following connections:

S is a member mounted on a stationary pivot S' to be angularly adjustable thereabout. $S^2$ is a link pivotally connected as at $S^3$ to the member S and at its opposite end pivotally connected to the link P in axial alignment with the fulcrum of the lever M'. This pivotal connection is preferably formed by a pin $P^2$ secured to the lower end of the lever M' and engaging a hub $P^3$ on the link P'. Surrounding this hub is a sleeve $S^4$ at the end of the link $S^2$, so that all of the parts M', P and $S^2$ are permitted independent rotation about the axis of the pin $P^2$. T is an arm connected to the rockable member N so as to extend downward therefrom below the arbor B. The lower end of the arm T carries a pivoted roller T' which is in the plane of the member S and is adapted to engage a slot $T^2$ in said member which is radial with respect to the axis of the pin S'. Thus, when the member N is rocked by a movement of the manual lever O, a rocking movement will be imparted to the arm T which, through engagement of the roller T' with the slot $T^2$, will rock the member S about the pivot S' and, through the connecting link $S^2$, will draw the pin $P^2$ into axial alignment with the shaft Q'. In such position of the pin $P^2$ and shaft Q', the rocking movement of the lever P will not impart any movement to the lever M'. After the member S has been rocked, as just described, the slot $T^2$ will be turned at such an angle as to permit the roller T' to disengage therefrom so that the movement of the members N and T, on actuation of the lever O, may be continued. This is the portion of the movement which is used in rotating the index disc L, there being sufficient lost motion between the pawl N' and lug $L^2$ for the prior rocking movement of the member S. On the return movement of the lever O and arm T actuated thereby, the roller T' will again enter the slot $T^2$ and will rock the member S in the reverse direction. A spring stop U forms a cushion for the member S at the end of its return movement, and a notch $T^3$ with which the roller T' is engaged will hold the parts in this position.

Operation

In using the machine, the work to be ground, such as an annular cage member, is first secured upon the work holder C by engaging one end with one of the annular step bearings C', $C^2$, etc., corresponding in diameter. The plate $C^5$ is then placed on the pin $C^3$ and clamped against the other end of the member I by means of the nut $C^4$. Before clamping the member I is rotatably positioned so that the center of one of the segmental slots therein is aligned with the axis of the grinder wheel D. The trimmers K are then adjusted so that the trimming points on opposite sides of the axis of the grinding arbors are spaced from each other by a dimension corresponding to the width of the finished ground slot. The stops J' and $J^2$ are also adjusted so that the grinder wheels $D^2$ will be in operative relation to the trimming points when the member F is rocked by the lever I to the limits imposed by said stops. In other words, the grinders when moved axially past the trimming points in either one of the positions determined by the stops J', $J^2$ will have their peripheries trimmed so that the grinding surface is exactly aligned with the corresponding edge of the finished slot.

Figure 6:
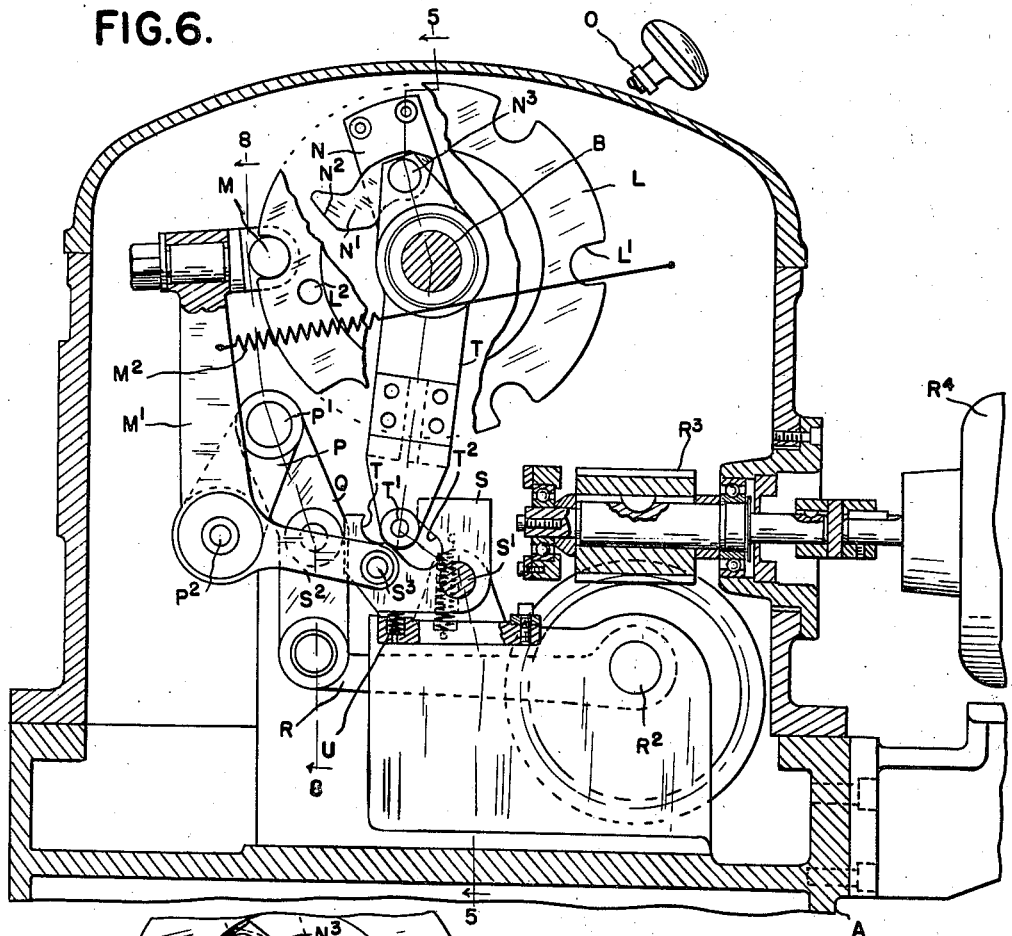
Fig. 6 is a section substantially on line 6—6 of Fig. 5.
Figure 7:
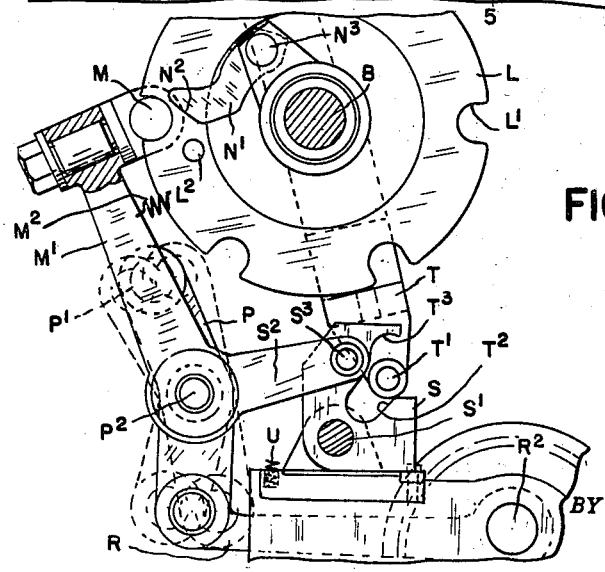
Fig. 7 is a view similar to a portion of Fig. 6, showing the parts in different positions of adjustment.

While the adjustments above described are being made, the lever O is in the position shown in full lines in Fig. 4, in which position the fulcrum pivot $P^2$ for the lever M' is aligned with the axis of the pin Q' forming the fulcrum for the lever Q. The motor $R^4$ is then energized to drive the worm gearing $R^3$ which revolves the crank shaft $R^2$ and a crank pin R'. The latter imparts a reciprocatory movement to the rod R which, through its connection with the lever Q, will produce a corresponding oscillation of this lever. However, because of the alignment of the fulcrum pins $P^2$ and Q', no movement is imparted to the lever M', the link P merely oscillating about the common axis of these pins. Lever O is then moved toward the left (Fig. 4) which, through the connections $N^6$ and $N^5$, rock the member N and with it the arm T. This will rock the member S on the pin S' from the position shown in Fig. 7 to the position shown in Fig. 6. Such rocking movement of the member S will move the member $S^2$ to the left (Fig. 6), thereby swinging the fulcrum pin $P^2$ out of alignment with the fulcrum pin Q', whereupon the link P will communicate the oscillatory movement of the lever Q to the lever M'. The oscillation of the lever M' will be communicated through the pin M to the disc L, and from the latter to the arbor B of the work holder. The amplitude of this oscillatory movement is progressively increased as the pin $P^2$ moves away from alignment with the pin Q', so that when the lever O is at the limit of its movement to the left (Fig. 4), the oscillation imparted to the work in the holder C corresponds to the length of the slot to be ground. The operator may then actuate the lever I to move the grinder wheels $D^2$ on the arbors D and D' into engagement with the slots on opposite sides of the axis of the work holder. Thus the annular cage member I will be oscillated about its axis corresponding to the length of the slots, while the grinder wheels are simultaneously moved transversely or radially with respect to this axis across the surface to be ground. After the grinding of one edge of the slot in this manner, the lever I is used to rock the member F to its opposite limit of movement, which aligns the grinder wheels with the opposite edge of the slot. The handles of the levers O and I are sufficiently close to each other that the operator may grasp both levers, one with each hand, and simultaneously operate the same.

One important feature of this operation is that the oscillation imparted to the work holder is a substantially harmonic movement which avoids imparting any vibration or shock to the work that might otherwise interfere with the accuracy of the grinding. Also, the amplitude of the oscillation is gradually increased from zero to the maximum, during movement of the lever O from its neutral position to its limit at the left.

After the grinding of one pair of slots, as just described, the lever O is moved from its position at the left toward the right. The first effect is to decrease the amplitude of the oscillation of the work holder to zero, this being accomplished by the rocking of the member S around the pivot S' and bringing the pins $P^2$ and $S^4$ in alignment, as previously described. A further movement of the lever O will disengage the roller T' from the slot $T^2$ in the member S, and, through the pawl N', will continue the rotation of the index disc L until another notch L' comes into registration with the pin M on the lever M'. The spring $M^2$ will then draw the pin into this notch to prevent further movement and to position the work with another pair of slots in operative relation to the grinders. During the return movement of the lever O from its position at the right (Fig. 4) to the position shown in full lines, the member N and pawl N' will also be returned, but the pawl will latch over the lug $L^2$ without disturbing its position. The movement of the lever O from its neutral position to the left will repeat the operations previously described.

What I claim as my invention is:

1. A slot grinding machine comprising a holder for a slotted member, means for oscillating said holder longitudinally of the slot in said member, a grinder of a diameter less than the width of said slot, a guideway on which said grinder is movable through said slot during the oscillation of said holder, said guideway being movable transversely to bring said grinder into grinding engagement with a side wall of said slot, and an adjustable stop for limiting the transverse movement of said guideway toward said side wall.

2. A slot grinding machine comprising a holder for a slotted member, means for oscillating said holder longitudinally of the slot in said member, a grinder of a diameter less than the width of the slot, a carriage for said grinder, a guideway on which said carriage is movable to carry said grinder through the slot in said member, a support for said guideway rockable transversely to the direction thereof to bring said grinder alternatively into grinding engagement with the opposite side walls of said slot, and adjustable stops for limiting the rocking movement of said support and thereby determining the width of the ground slot.

3. A slot grinding machine comprising a holder for a slotted member, means for oscillating said holder longitudinally of the slot in said member, a grinder of a diameter less than the width of the slot, a carriage for said grinder, a guideway on which said carriage is movable to carry said grinder through the slot in said member, a shaft extending parallel to said guideway, a member supporting said guideway transversely rockable on said shaft to bring said grinder alternatively into grinding engagement with the opposite side walls of said slot, and adjustable stops for limiting the rocking movement of said supporting member.

4. In a slot grinding machine, a holder for an annular member having circumferentially extending slots on diametrically opposite sides thereof, means for oscillating said holder about the axis of said annular member, a pair of grinder wheels on opposite sides of said holder and of a diameter less than the width of the slots in said annular member, a carriage for each grinder, a guideway on which said carriages travel to move said grinder wheels radially with respect to said holder into and out of the slots in said annular member, a shaft extending parallel to said guideway, a member supporting said guideway rockable on said shaft to move said grinders from one side to the other of said slots, adjustable stops for limiting the rocking movement of said supporting member, a manually operable lever connected with one of said carriages for moving the same on said guideway and also for rocking said supporting member, and connecting means for moving the other carriage simultaneously and oppositely to the movement of said first carriage.

5. In a slot grinding machine, a rotatable holder for an annular member having a series of circumferentially extending slots therein, a grinder of a diameter less than the width of said slots, means for moving said grinder radially with respect to said holder into and out of a slot in said member, an indexing mechanism for said holder, means for oscillating said holder with respect to each of its indexed positions, and a manually operable member controlling both said indexing mechanism and said oscillating means adapted to start and stop the oscillation respectively before and after each indexing movement.

6. In a slot grinding machine, a rotatable holder for an annular member having a series of circumferentially extending slots therein, a grinder of a diameter less than the width of said slots, means for moving said grinder radially with respect to said holder into and out of a slot in said member, an indexing mechanism for said holder, means for oscillating said holder with respect to each of its indexed positions, and means for gradually increasing and decreasing the amplitude of oscillation between zero and maximum limits.

7. In a slot grinding machine, a rotatable holder for an annular member having a series of circumferentially extending slots therein, a grinder of a diameter less than the width of said slots, means for moving said grinder radially with respect to said holder into and out of a slot in said member, an indexing mechanism for said holder, means for oscillating said holder with respect to each of its indexed positions, means for gradually increasing and decreasing the amplitude of oscillation between zero and maximum limits, and a manually operable member for actuating both said indexing mechanism and said oscillating controlling means in different portions of its movement, whereby oscillation of said holder is gradually stopped prior to each indexing operation and is started and gradually increased in amplitude after each indexing operation.

ALFRED H. RZEPPA.